United States Patent
Horovitz

(10) Patent No.: US 8,210,945 B2
(45) Date of Patent: Jul. 3, 2012

(54) SYSTEM AND METHOD FOR PHYSICALLY INTERACTIVE BOARD GAMES

(75) Inventor: Ronen Horovitz, Haifa (IL)

(73) Assignee: Eyecue Vision Technologies Ltd., Yokneam (IL)

( * ) Notice: Subject to any disclaimer, the term of this patent is extended or adjusted under 35 U.S.C. 154(b) by 305 days.

(21) Appl. No.: 12/600,293

(22) PCT Filed: May 18, 2008

(86) PCT No.: PCT/IL2008/000675
§ 371 (c)(1),
(2), (4) Date: Nov. 16, 2009

(87) PCT Pub. No.: WO2008/139482
PCT Pub. Date: Nov. 20, 2008

(65) Prior Publication Data
US 2010/0151942 A1 Jun. 17, 2010

Related U.S. Application Data

(60) Provisional application No. 60/924,463, filed on May 16, 2007.

(51) Int. Cl.
G06F 17/00 (2006.01)

(52) U.S. Cl. .......................................................... 463/36

(58) Field of Classification Search .................. 463/2–6, 463/30–36
See application file for complete search history.

(56) References Cited

U.S. PATENT DOCUMENTS

| | | | | |
|---|---|---|---|---|
| 6,049,281 | A * | 4/2000 | Osterweil | 340/573.4 |
| 6,745,236 | B1 | 6/2004 | Hawkins et al. | |
| 7,515,734 | B2 | 4/2009 | Horovitz et al. | |
| 7,720,257 | B2 * | 5/2010 | Morellas et al. | 382/103 |
| 2006/0083423 | A1 | 4/2006 | Brown et al. | |
| 2006/0125691 | A1 | 6/2006 | Menache et al. | |
| 2006/0258446 | A1 | 11/2006 | Nguyen et al. | |
| 2008/0260244 | A1 | 10/2008 | Kaftory et al. | |
| 2009/0180669 | A1 | 7/2009 | Horovitz et al. | |
| 2011/0193990 | A1 * | 8/2011 | Pillman et al. | 348/229.1 |

FOREIGN PATENT DOCUMENTS

| | | |
|---|---|---|
| WO | WO 2008/152644 | 12/2008 |
| WO | WO 2009/007978 | 1/2009 |

OTHER PUBLICATIONS

U.S. Appl. No. 12/582,015, filed Oct. 20, 2009, Horovitz, Ronen.

* cited by examiner

*Primary Examiner* — Ronald Laneau
(74) *Attorney, Agent, or Firm* — Pearl Cohen Zedek Latzer, LLP

(57) ABSTRACT

A system and method of detecting a movement in space of a game participant and altering a scene of a game shown on an electronic display in response to the detected movement.

16 Claims, 2 Drawing Sheets

SYSTEM AND METHOD FOR PHYSICALLY INTERACTIVE BOARD GAMES

CROSS REFERENCE TO RELATED APPLICATIONS

This application is a National Phase Application of PCT International Application No. PCT/IL2008/000675, International Filing Date May 18, 2008, claiming priority of U.S. Provisional Patent Application, 60/924,463, filed May 16, 2007, both of which are incorporated by reference herein.

FIELD OF THE INVENTION

The invention pertains generally to image recognition for interactive entertainment. More specifically, this application relates to using an imaging device to recognize the activities of players of a game such as a board game, and to advance the game play in accordance with such recognized activities.

BACKGROUND TO THE INVENTION

U.S. Pat. No. 6,967,566 to Weston, et al., which issued on Nov. 22, 2005, discloses an interactive treasure hunt game. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by an imaginary character that the card may represent.

U.S. Pat. No. 6,690,156 to Weiner, et al., which issued on Feb. 10, 2004, discloses a device for detecting physical objects, each object having a detectable identifier, the objects being disposed in association with a graphic display device, comprising a detector operable to detect a location of said identifier relative to said graphic display device, and to output a signal bearing information of said first location, wherein said device is operable to determine, by electronic processing, from said signal, a relative location of said physical object in relation to said graphic display device.

U.S. Pat. No. 5,855,483, which issued to Collins, et al., on Jan. 5, 1999, discloses an interactive apparatus for use with a computer, comprising a transceiver for two-way wireless communication with a plaything, the transceiver having terminals for connection to the computer, and a control device for causing the computer to send and receive information to and from the plaything via the transceiver to enable the plaything to provide interactive fantasy simulation of the behavior of a corresponding real-world object.

Classic board games may include a board, tiles, cards, tokens and dice and other pieces. Play may generally be advanced by a randomizing event such as a roll of dice, picking a card or spinning a wheel. In response to the randomizing event, a player may take an action such as moving a object from a first position to a second position, answering a question, or taking some physical action.

SUMMARY OF THE INVENTION

Some embodiments of the invention may include a system for interactive gaming, having an imager to capture a series of images of a player of a game; an electronic display to display an image of a scene of the game, such scene including a representation of the player in the scene; and a processor to detect a movement of the player captured in the series of images and to issue a signal to the display to move the representation of the player in the scene correspondingly to the movement of the player in the series of images.

In some embodiments, the processor may detect a pointing movement of the player.

In some embodiments the processor may detect a vertical movement such as a jump of said player.

In some embodiments the processor may detect a number of pre-defined movements of the player in the images and may issue a signal to move the avatar of the player in the scene by the number of movements.

In some embodiments, the processor may detect a pre-defined object in an image and may move an avatar of the player in the scene to correspond to the movement of the pre-defined object.

Some embodiments of the invention may include a system for generating a randomizing event of a game, and may include an imager to capture a series of images of a player of an interactive game; an electronic display to display a representation of a randomizing object; and a processor to detect a pre-defined movement of the player in the series of images, and to issue a signal to the electronic display to move the representation of the randomizing object to correspond to the pre-defined movement, and to generate a random number.

In some embodiments, a randomizing object may include a dice, and the pre-defined movement may include a movement of an arm of the player, and the generating of the random event may include generating a number rolled by the dice.

In some embodiments the processor may detect one or more of a number of pre-defined movements, such as a movement of an arm of a player, and a movement of an opening of a first of a player.

In some embodiments a randomizing object may include a number wheel, and the pre-defined movement may include a movement of a hand of a player to spin an imaginary number wheel. Generating the randomizing event may include generating a number rolled by the number wheel.

Some embodiments of the invention may include a method of displaying a scene of a game, such method including displaying a representation of a player in scene of a game on an electronic display; capturing a series of images of the player; detecting a pre-defined movement of the player in the series of images; and altering a display of the representation of the player to correspond to the pre-defined movement of the player.

In some embodiments, a method may entail comparison of a movement of a player detected in a series of images to one or more stored templates of motions in images.

In some embodiments a method may entail issuing an instruction to a player that includes an instruction to perform a pre-defined movement, and comparing the movement of the player detected in the series of images to a pre-defined template of movements that are associated with movement described in the instruction.

Some embodiments of the invention include a system for interactive gaming having an imager to capture a series of images of a gaming object such as a card or playing piece; an electronic display to display an image of a scene of an interactive game and to display a representation of a player in such scene; and a processor to detect the gaming object in the series of images, and to issue a signal to alter the displayed scene in accordance with an instruction associated with the gaming object.

In some embodiments, the system may include an object to be worn or carried by a player of the game, an imager is to capture the object in the series of images, and a processor is to associate the object and the gaming object with the player. The processor may further issue a signal to the display to alter the displayed scene of the game in accordance with the instruction associated with the gaming object.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

DETAILED DESCRIPTION OF THE PREFERRED EMBODIMENTS

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions upon execution result in a method of an embodiment of the invention.

As used in this paper, and in addition to its regular meaning, the term game or interactive game may refer to a series of instructions, some of which may be executed by one or more players, by a processor or by a combination of players and a processor, whereupon such execution an action or response may be taken by another player, by the processor or by a combination of players and a processor. A game may also refer to a challenge or a series of challenges and responses taken by one or more participants, such as for example in the context of an exercise regimen, a training program, a physical therapy session or other scenarios.

Figure 1:
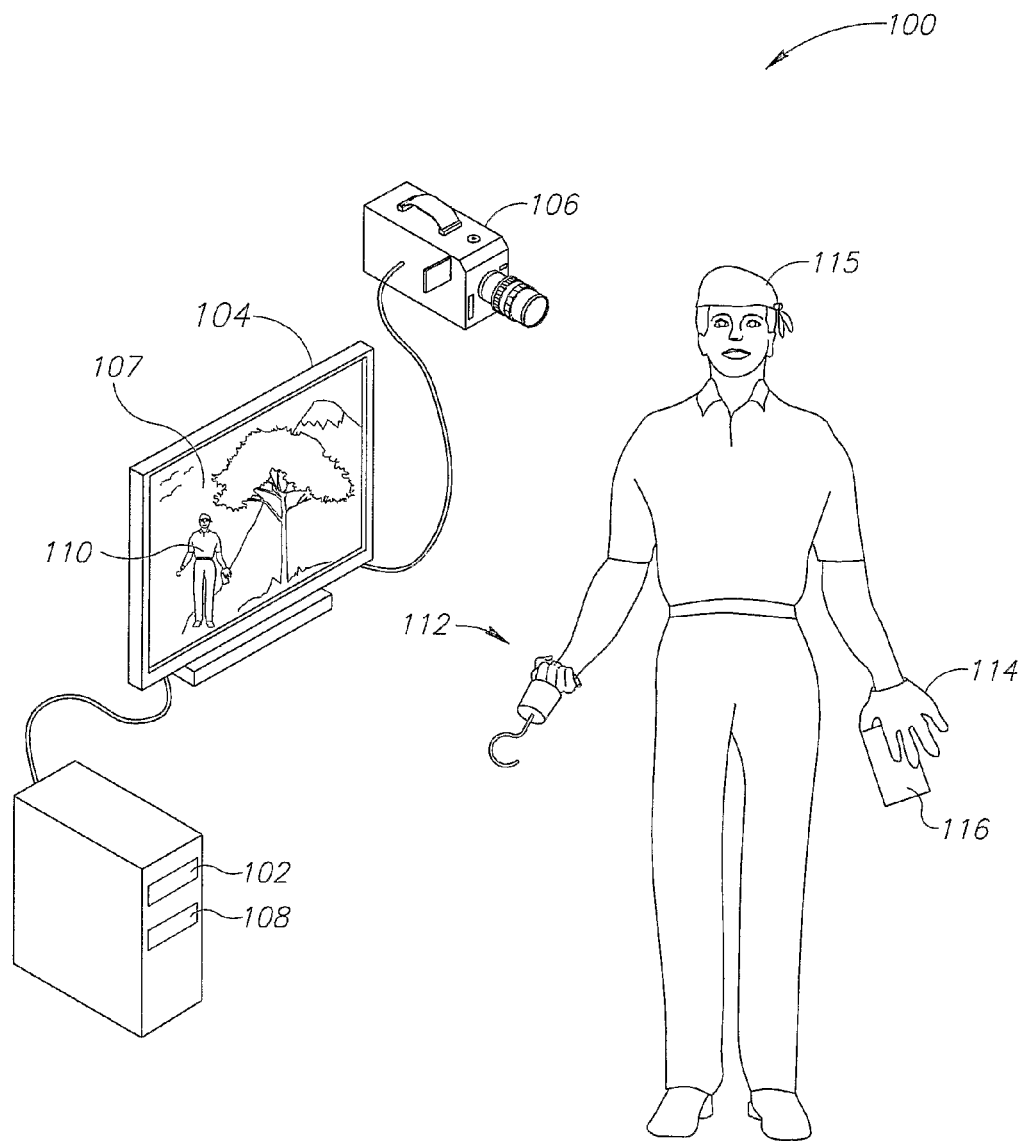
FIG. 1 is a conceptual illustration of a system in accordance with an embodiment of the invention.

Reference is made to FIG. 1, a conceptual illustration of a system in accordance with an embodiment of the invention. In some embodiments, a system 100 may include a processor 102 as may be present in for example a personal computer, game console or other electronic device, an electronic display 104 such as a television, computer monitor or other display, a camera, image capture mechanism or other imager such as for example a digital camera, a digital video camera 106 or a camera such as webcam or those compatible with transmission of images over a network. Processor 102 may be connected to, linked with or otherwise associated with, a memory 108 that may store for example one or more rules or series of rules for an interactive game.

In some embodiments, one or more players may be in a range or view for capture of images by camera 106. One or more players may wear or carry an object 112, such as a hat, arm-band, bandana, cloak or other item, having a color or pattern of colors, where the object may be included in one or more of the images captured by camera 106, and the colors or pattern of colors may be identified by processor 102. A color or pattern of colors may be associated in memory 108 with a particular player.

In some embodiments, display 104 may display one or more scenes 107 of a game, such as a game board, and may display one or more pieces or other representations of a player or player substitute. For example, display 104 may show a backgammon board, where the red pieces represent a first player and black pieces represent a second player. Likewise, display 104 may show a chess board with its associated pieces, or for example a Monopoly™ board where a first player who is represented by for example the car piece may be shown on display 104 by for example an avatar 110 sitting inside a car on the Monopoly board. Other representations of a player or participant are possible.

In operation, a player may perform an action such as for example rolling dice or moving a designated number of spaces. The action of the player may be captured by imager or camera 106 in one or a series of images, and such action may be identified as being part of or associated with the displayed scene 107 of a game, and with the player taking such action. The actions may be identified and interpreted by processor 102 in accordance with the rules of the game or the instructions provided to a player of the game, and the scene 107 of the game that is shown on display 104 may be altered to reflect the identified action. In some embodiments, the tasks involved in playing a board game may be recognized by camera 106 and may provide a physically interactive experience for the players. While maintaining the play features of a traditional board game, embodiments of the invention may allow players to actively and physically participate in game action. In some embodiments, a series of physical challenges may be presented to one or more players, and camera 106 may detect a performance of such challenges, and may alter a scene 107 of the game presented on display 104 in accordance with the performance of the challenges.

In an embodiment, one or more players may stand or appear in a view of camera 106. Scene 107 of a game may appear on the display 104 in a 2D or 3D graphic simulation, with graphically created avatars 110 placed at the different locations on the board scene 107 to represent the state of different players in the process of the game.

For example, a player who may be wearing an object 112 of a particular color that may be recognized by the camera 106 and that may be associated with the player, may perform a physical action such as shaking a forearm from a horizontal position to a 45° position relative to a floor, while holding a closed fist. Other actions, series of actions or templates of actions may be performed and recognized. Camera 106 may capture the motion of the player in or more or captured images. The motion of the player may be compared in real time in a series of such images, and processor 102 may detect the movement of the player's forearm. The continuity and direction of the moving forearm may be tracked over a series of images to detect the period during which the player pretends to 'spin' a dice, and when the pretended spinning stops. In some embodiments, processor 102 may detect an opening action of a first at the end of the moving forearm as an indication that the spinning of the pretend dice has stopped.

In some embodiments, camera 106 may be or include for example a 320×240 pixel image capture device with for example a 45 degree field of view. Other cameras 106 having other configurations are possible. In some embodiments, a player may be within six feet of camera 106, though other distances are possible depending on the configuration of camera 106.

When processor 102 detects that a particular player is moving a forearm or otherwise taking a pre-defined action that is visible in images captured by camera 106, processor 102 may issue a signal to display 104 to for example show a scene of spinning dice or of another indication or representation of an action of a randomizing device such as dice. In some scenes an avatar 110 or representation of the player who is detected to be spinning the dice may be displayed in scene 107.

In some embodiments, processor 102 may segment one or more captured images into for example color segments, and may identify or detect the particular color of object 112 in one or more of such segments. Processor 102 may evaluate a series of images and may find changes in positions of object 112 or other objects that appear in an area of a color segment in one or more of such images. A probability calculation may be used to determine whether a repeated movement or change in a position of for example a limb or other article in an area of a color segment of an image represents a pre-defined movement such as a dice spin or other motion. No dice or other object need be used by the player whose arm is moved as part of the pretended spin of the dice.

In some embodiments, processor 102 may evaluate images for a particular movement template only at times or intervals when such particular movement is expected by a player. For example, in a period following a move of a first player, processor 102 may issue an instruction to a second player to spin a dice. Processor may scan images captured after such instruction was issued to match a detected movement in such images with a pre-defined movement template for a player spinning dice. Scanning an image or series of images for a particular motion template may speed processing and detection time of the motion.

At the end of the detected dice spinning movement, processor 102 may generate and display a random number or take some other action to replicate the results of the spin and display the spun number. In some embodiments, processor 102 may alter or change scene 107 of a displayed game board to move a playing piece that may be associated with the player who spun the dice, in accordance with the results of the randomizing event. For example, if processor 102 generated a randomized number of 5 in response to a dice spinning movement of a player, a scene 107 of the board game as is shown on display 104 may be changed to move the avatar 110 or other representation of the spinning player by five spaces.

In some embodiments, camera 106 may detect an instruction on for example a card selected by a player, and may alter a displayed game scene in response to such selection. For example, a player who may for example be wearing a colored glove, hat or other object 112 may select a card 116 from a deck. The card 116 may be colored or may include a colored pattern that may be in a view of camera 106. Processor 102 may detect a movement of the object 112 in an image and create a color segment of an image that may include such object 112. When a card 116 is selected, processor 102 may detect the presence of the color or color pattern of the card 116 in, near or proximate to the color segment of the object 112 in the image. Processor 102 may implement an instruction stored in memory 108 that is associated with the color pattern of the selected card 116, and may change a scene 107 shown on display 104 to correspond with the instruction on the selected card 116. For example, a player wearing a colored glove 114 may select a card 116 having a particular color pattern that instructs him to go to jail. Processor 102 may detect the colored glove 114 in an image, and may detect the colored pattern of card 116 proximate to the color segment of the image wherein the colored glove 114 or other object 112 appeared. The appearance of the card 116 in or near the segment of the glove 114 may be an indication that the player with the particular colored glove 114 drew the card 116. Processor 102 may associate the instruction on the card 116 with the player who is determined to have drawn the card 116, and may alter the scene 107 shown on display 104 in accordance with the instruction. Returning to the example above, the avatar 110 on the display 104 of the player who drew the card 116 may be sent to jail as jail appears on the display.

In some examples, a player who draws a card 116 may place the card on for example a colored pad in view of camera 106, where the color of the pad is associated in memory 108 with a particular player. Processor 102 may detect the presence of the card 116 on the player's pad and may execute an instruction on the card 116 in respect of such player. The execution of such instruction may alter a scene 107 of a game board that is shown on display 104.

In some embodiments, as part of for example a calibration or identification step of a player in front of camera 106, processor 102 may associate and record a skin hue of a player. A later detection of such skin hue in for example a hand of a player that appears in an image, may be included as a factor in a determination of an identity of a player who drew a card 116 or took another action. Color or hues of other objects such as clothing may also be part of a process of identifying a player captured in a later image.

In some embodiments, object 112 may be thematically related to the game to incorporate verisimilitude to the prop. For example, in a game having a circus theme, the players may wear hand and forehead color bands, in a pirate-based board game the players may wear a color bandana and hold a colored hook in one hand. Other props or objects 112 may be used.

In some embodiments, at the beginning of a game, or at some other time, a static position of a player may be detected for example as part of the game by examining the positions of objects 112 in relation to other objects in an image, or by issuing an instruction to the players to step into view of camera 106 and perform a given action or physical motion.

In some embodiments, an object such as a glove 114 worn or carried by a player may be brought into a view of camera 106 and may be detected in an image captured by camera 106. A player may initiate a randomized event by for example moving his hand to replicate a motion that spins a wheel. Processor 102 may detect for example a circular or rotary movement of the glove 114 in a series of captured images, and may issue a signal to display a scene of a spinning wheel as a randomizing event. The direction and duration of spinning of the wheel shown on display 104 may correspond to the direction and speed of the movement of the glove 114 as was captured in the series of images.

A motion analysis function may be implemented by using one or more inter-frame difference thresholding operations on a series of frames in a video sequence or between frames which are close in time, depending on the nature of the desired motion to be captured and the frame rate of camera 106. Portions or segments of pixels in binarized images which are grouped in connected segments may reflect a motion of a player's hands. Comparing a location of the connected segments in the series of images may yield a speed and direction of the motion. Speed and direction vectors may be included as determinants for a statistical comparison to a template of various known or predefined motions that may be stored in memory 108. Inputs for the probability determination that a detected motion is to be interpreted by processor 102 as a pre-defined action, such as spinning dice may include an association of the detected motion with an area of a color segment in one or more images that may be associated with a player whose turn it is to spin. So, for example, if a dice-spinning motion is detected in or close to a color segment of a series of images that includes the color of an object 112 such as a bandana or hat that is known to be worn or carried by a player whose turn it is to spin the dice, then the processor 102 may apply a relaxed threshold of identification of the pre-defined motion to a determination as to whether the detected motion is to be characterized as the pre-defined spinning motion.

Color segmentation and tracking in a one or a series of images may be performed with any suitable tracking algorithm such as kalman filtering, CAMSHIFT or others. In some embodiments, when a motion is classified as matching a known motion template, such as dice spinning or a particular dance step, a rolling dice or dancing figure may be shown on display 104 to provide real-time feedback corresponding with the movement of the player, so that the results of the detected motion may be shown on display 104, as if the player were actually performing the action on the displayed object. Once the player stops shaking the dice, the dice on screen may stop on one of its facets. Similarly, while a player with a colored object 112 may be motioning to spin a wheel, the wheel may appear on display 104 as being moved by the player coincidently with the location of the hand of the user.

In some embodiments, a player may be requested to move a number of spaces or take one or more physical actions in view of camera 106 according to the output of the randomization task or perform another action. The player may take the action in view of camera 104, and the actions may be captured in one or a series of images. Processor 102 may detect the motions or actions of the player, may correlate the detected motions with the instructions, and may alter the scene 107 of the game shown on display 106 with the actions taken by the player. For example, a player may roll a five on a dice. The player may be instructed to jump five times in view of camera 106 and the movement of a player between different spaces on the board may be based on a recognition of a real movement by the player in the series of images, such as jumping forward, backward, or other actions. A change of direction may be performed by recognizing the direction the player points to, when for example the player is holding an object 112 or wearing a glove 114. The number of spaces to be moved on the playing board shown on display 104 may match the number of movements by the player in front of camera 106, and the avatar 110 of the player may be shown as jumping on the board in the scene 107.

The recognition of movements in a series of images may be based on specific movement and motion detection techniques. For example, in some embodiments, detection of a vertical jumping motion by a player may be performed, for example, by capturing a series of images of a scene wherein the jumping player appears. The images may be passed through a vertical gradient operator to convolute the images with an approximating vertical gradient kernel such as a Sobel operator. The resultant vertical gradient may emphasize horizontal edges in the image. Testing for the overall intensity of the gradient image may result in an indication for the mean local contrast of the image in a horizontal manner. When the participant is jumping vertically, due to the motion caused by the jumping activity and the fact that the camera has some integration time, the horizontal edges representing the participant may blur. When examining the overall intensity of the gradient image of a jumping participant, a sudden decrease in intensity value may be noticed in the frames where the participant is in the air in comparison to when the player is on the ground or at the top of the jump. A one dimensional signal of these gradient intensity values may be constructed as a function of the frame number f(t) where t represents the time domain or the frame number. A pattern of two local adjacent reductions may be found, and such pattern may indicated a jump with an identifiable starting point for the jump and a high point of the jump. Other motions or actions may be detected.

An image or series of images may be further analyzed with morphological operators and an adaptive threshold value to detect the jump may be established. Synchronization between the player's position in the real world and the avatar 110 representing him in the game can be used to show the avatar 110 jump on the display.

In some embodiments, a pattern of movements of an object 112 that may appear in a series of images may be part of a determination of an action being performed by a player. For example, a number of jumps performed by a player may be measured by the changes in a height of a bandana 115 or other object worn or carried by the player. For example, during a jump, a player may bend his knees and the bandana 115 may assume a lower position, then jump up and the bandana 115 may assume a higher position, and finally lower his knees upon landing so that the bandana 115 is again lower. Processor 102 may count the number of repetitions of such pattern to calculate a number of jumps of the player.

In some embodiments, particular motions of for example a limb of a player may be identified. These may include for example swinging a hand or an arm. In some embodiments, a static position of a player or of limbs or extremities of a player may be detected in response to an instruction to the player to stand still. An image of the player who may be wearing for example a bandana 115 and a colored glove 114 may identify the static position of the glove relative to the bandana 115. An evaluation of a movement of the glove 114 relative to the bandana 115 may be made in further images to determine compliance with an instruction to the player to raise his arm above his head. Other positions and detection of movements are possible. For example, processor 102 may detect motions of a player in response to movement instructions such as those that would be given in a game of 'Simon Says', or in a yoga, karate or aerobic dance lesson.

Figure 2:
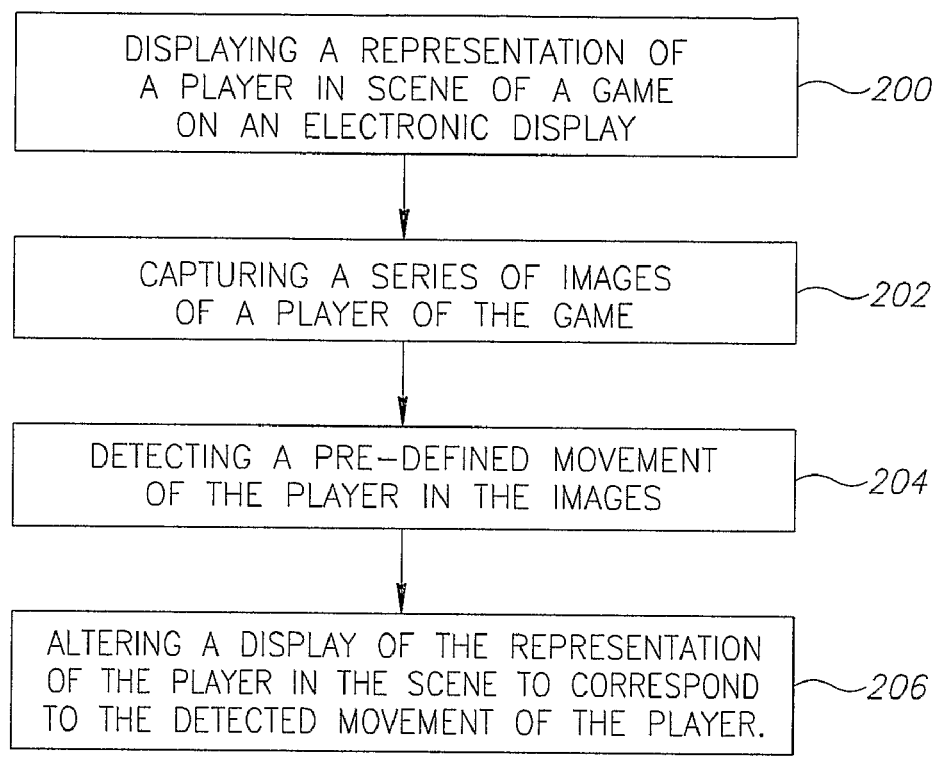
FIG. 2 is a flow diagram of a method in accordance with an embodiment of the invention.

Reference is made to FIG. 2, a flow diagram of a method in accordance with an embodiment of the invention. In block 200, a method may include displaying on an electronic display a scene of a game, and for example displaying a representation of a player in the scene. In block 202, the method may include capturing a series of images of a player of the game who may appear in a view of a camera or video camera. In block 204, the method may include a processor detecting one or more motions, pre-defined movements or changes in position of the player in the series of images. In block 206, the method may include altering the scene of the game shown on the display to correspond with the movement of the player that was detected in the series of images.

In some embodiments, a method may include identifying the nature of the movement in the series of images by comparing the movements or motions that were detected in the series of images to two or more templates or known patterns of movements.

In some embodiments, a processor may select a particular template or pattern of movements that corresponds to a movement that was requested of a player, and may compare the template to the movements or motions that were detected in the series of images. For example, a game may call for a player to take three steps backward. A processor may select a particular pattern of motions or movements that may be associated with backward steps, and may compare motions in the images to the selected template. Such a pre-selection may in some embodiments reduce the processing requirements and increase the speed of detection of the particular actions to be taken by a player.

It will be appreciated by persons skilled in the art that embodiments of the invention are not limited by what has been particularly shown and described hereinabove. Rather the scope of at least one embodiment of the invention is defined by the claims below.

I claim:

1. A system for interactive gaming, comprising:
    an imager to capture a series of images of a player of a game;
    an electronic display to display an image of a scene of said interactive game,
    said scene including a representation of said player; and
    a processor to:
        detect a movement of said player captured in said series of images, and
        issue a signal to said display to move said representation of said player in said scene correspondingly to said movement of said player in said series of images.

2. The system as in claim 1, wherein said processor is to detect a pointing movement of said player.

3. The system as in claim 1, wherein said processor is to detect a vertical movement of said player.

4. The system as in claim 1, wherein said processor is to detect a number of pre-defined movements of said player in said images and is to issue said signal to move said representation of said player in said scene by said number of moves.

5. The system as in claim 1, wherein said processor is to detect a pre-defined object in said image and to move said representation of said player in said scene correspondingly to said movement of said pre-defined object.

6. A system for generating a randomizing event for a game comprising:
    an imager to capture a series of images of a player of said game;
    an electronic display to display a representation of a randomizing object;
    a processor, said processor
        to detect a pre-defined movement of said player in said series of images,
        to issue a signal to said electronic display to move said representation of said randomizing object correspondingly to said pre-defined movement, and
        to generate a random number.

7. The system as in claim 6, wherein said randomizing object comprises a representation of a dice, wherein said pre-defined movement comprises a movement of an arm of said player, and wherein generating said randomizing of event comprises generating a number rolled by said representation of said dice.

8. The system as in claim 6, wherein said processor is to detect a plurality of pre-defined movements, a first of said plurality comprising a movement of an arm of said player, and a second of said plurality of said movements comprising an opening of a first of said player.

9. The system as in claim 6, wherein said randomizing object comprises a representation of a number wheel, and wherein said pre-defined movement comprises a movement of a hand of said player, and wherein generating said randomizing of event comprises generating numbers rolled by said representation of said number wheel.

10. A method of displaying a scene of a game comprising:
    displaying a representation of a player in said scene of said game on an electronic display;
    capturing a series of images of said player of said game;
    detecting a pre-defined movement of said player in said series of images; and
    altering a display of said representation of said player in said scene to correspond to said movement of said player.

11. The method as in claim 10, comprising comparing said movement of said player detected in said series of images to a plurality of stored motion templates.

12. The method as in claim 10, comprising:
    issuing an instruction to said player, said instruction including an instruction to perform said pre-defined movement, and
    comparing said movement detected in said series of images to a motion template where said motion template is associated with said pre-defined movement.

13. A system for interactive gaming, comprising:
    an imager to capture a series of images of a gaming object;
    an electronic display to
        display an image of a scene of an interactive game and
        display a representation of a player in said scene; and
    a processor to
        detect said gaming object in said series of images, and
        issue a signal to alter said scene in accordance with an instruction associated with said gaming object.

14. The system as in claim 13, comprising an object to be carried by a player of such game, wherein said imager is to capture said carried object in said series of images, and wherein said processor is to associate said carried object and said gaining object with said player, and wherein said signal to alter said scene comprises moving said representation of said player in accordance with said instruction associated with said gaming object.

15. The system as in claim 13, wherein said gaming object comprises a card having a color pattern.

16. The system as in claim 13, comprising a mat to receive said gaming object, said mat associated with a player of said interactive game.

* * * * *